United States Patent Office 3,415,677
Patented Dec. 10, 1968

3,415,677
TREATMENT OF GLASS SURFACES
Frank Moser, Sarver, and John J. Everhart, New Kensington, Pa., assignors to PPG Industries, Inc., a corporation of Pennsylvania
No Drawing. Continuation-in-part of application Ser. No. 495,717, Oct. 13, 1965. This application Dec. 9, 1965, Ser. No. 512,794
6 Claims. (Cl. 117—124)

ABSTRACT OF THE DISCLOSURE

A process to render soda-lime-silica transparent glass surface resistant to iridescence, staining and scumming by treating the glass surface with a zinc acetylacetonate solution at a temperature between about 100° F. and 800° F.

---

This application is a continuation-in-part of application Ser. No. 495,717, filed Oct. 13, 1965, now abandoned.

The present invention relates to a process for protecting the surface of glass from iridescence, scumming and staining. More particularly, the present invention relates to a process in which soda-lime-silica glass is contacted with an organic zinc solution at a temperature between about 100° F. and 800° F. to incorporate zinc on the surface of the glass which provides protection against iridescence, scumming and staining of the glass.

Glass stored for any prolonged length of time under humid atmospheric conditions has a tendency to discolor and develop a stain on its surface which destroys the transparency of the glass and its usefulness as a viewing medium. This weathering of the glass is particularly acute when the glass is stored in stacks or contacting sheets. The same weathering of the glass develops, though at a much slower rate, on isolated pieces of glass which are stored for prolonged periods of time.

The weathering reaction manifests itself initially as the development of a siliceous film on the glass sheet of irregular thickness having a relatively high refractive index compared to that of the base glass sheet. The surface film resembles a light film of oil in that it appears multi-colored, containing various shades of yellow, red, green and purple. Iridescence is the term which describes the condition and appearance of the glass sheet upon which this siliceous film has developed. The higher refractive index of the iridescent film is due to higher concentrations of alkali and alkaline earth metals in the siliceous film compared to the concentrations of these metals in the underlying glass.

As the weathering reaction continues, the surface of the glass becomes white and spotted. This further evidence of the deterioration of the glass surface is referred to as scum. The scum is largely a mixture of $Na_2SiO_3 \cdot xH_2O$, $Na_2CO_3$, $CaSiO_3 \cdot xH_2O$ and $CaCO_3$. If the scummed glass surface is washed and white spotted discoloration remains on the glass surface or if the surface is noticeably etched, the glass is said to be stained. The stain can only be removed by grinding and polishing the glass.

Ordinary glass is composed of an acidic oxide such as silica and various metal oxides such as the oxides of the alkali and alkaline earth metals. These metal oxides even in glass are more or less soluble in water so that glass surfaces exposed to moisture are subjected to a leaching reaction that tends to dissolve these more soluble components out of the glass surface. The weathering reaction against which the present invention protects and which is responsible for iridescence, scumming and staining of glass during storage may be described as follows: ordinary soda-lime-silica glass surfaces are hydrophilic, that is, they tend to adsorb moisture from the atmosphere which collects on the surface of the glass. This adsorbed moisture dissolves the relatively soluble sodium ions and the somewhat less soluble calcium ions from the glass surface producing an aqueous solution of sodium hydroxide and calcium hydroxide on the glass surface. This aqueous sodium hydroxide and calcium hydroxide solution has the further ability to dissolve silicates from the surface of the glass. The result of this further reaction is the formation of $Na_2SiO_3 \cdot xH_2O$ and $CaSiO_3 \cdot xH_2O$ which constitutes the major part of the scum.

A chemical analysis of the scum further reveals that carbonates such as sodium carbonate and calcium carbonate are also present. It is theorized that carbon dioxide from the atmosphere reacts with some of the sodium and calcium ions leached from the surface of the glass to produce the respective carbonate in the scum.

It is known that iridescence, scumming and staining of glass sheets subjected to humid atmospheric conditions during storage can be inhibited by contacting the surfaces of the glass with a slightly acidic agent having a pH value between 4 and 7. The disclosed acidic agents are various metallic salts. The acidic agents are contacted with the glass surface by spraying a solution of the metallic salt on the glass surface or by combining the acidic agents with an inert carrier which is thereafter contacted with the surface of the glass to be protected. Such a method is disclosed in British Patent 861,578.

In copending application Ser. No. 424,853, filed Jan. 11, 1965, by Frank Moser and Richard R. Lewchuk, which is a continuation-in-part of application Ser. No. 166,354, filed Jan. 15, 1962, there is disclosed a technique for protecting stored glass sheets from iridescence, scumming and staining. The technique disclosed consists of treating the glass with a basic solution of an amphoteric metal ammino compound. The dried residue of the treating solution is allowed to remain on the glass during storage to protect the glass sheet and must subsequently be washed off when the glass is put to its ultimate use. The amphoteric metal ammino compounds preferred are zinc ammino chloride and zinc ammino nitrate.

What has been discovered in the present nvention is that various organic zinc compounds, in particular zinc acetylacetonate $Zn(C_5H_7O_2)_2$, when contacted with the surface of glass at elevated temperature produce a transparent zinc film on the glass sheet which resists iridescence, scumming and staining. The zinc film and its method of application does not produce an objectionable solution residue on the glass which must subsequently be removed before the glass sheet can be put to its end use. Preferably, the present invention involves contacting a soda-lime-silica glass article heated to between 400° F. and 800° F. with a relatively dilute solution of zinc acetylacetonate. The organic component of the zinc acetylacetonate compound volatilizes during application, developing a transparent protecting film of zinc on the glass which resists iridescence, staining and scumming during storage.

The zinc in the present invention is not deposited on the glass surface as a film of zinc oxide. Instead, the zinc adheres to the glass surface in the present invention by a type of bridge bonding mechanism between unsatisfied hydroxyl groups present on the glass surface. The amount of zinc incorporated in the glass is relatively small compared to that adhered by the development of a zinc oxide film and, in addition, it is assumed that little metal to metal bonding occurs between neighboring zinc ions. It is believed that the zinc bridge bonded surface of the glass resists moisture adsorption by satisfying the unsatisfied hydroxyl groups on the glass surface so they do not attract any polar water molecules from the atmosphere.

Although zinc acetylacetonate is preferred as the organic zinc compound in the present invention, other organic zinc compounds may be used. These other organic zinc compounds, however, do not exhibit all of the advantages of zinc acetylacetonate, particularly with respect to the transparency of the treated glass. These other organic zinc compounds can be mixed with zinc acetylacetonate in varying proportions if residues from the treating solutions are not objectionable on the glass. Among the other organic zinc compounds useful in preventing weathering, but which are not preferred, are zinc 2-ethyl-hexanoate, zinc stearate, zinc benzoate, zinc naphthalenate, zinc propionate, zinc ethoxypropionate and zinc oleate. These other organic zinc compounds are not preferred because they tend to develop varying degrees of haziness on the glass surface due to residue from the treating solutions. The solution residues reduce the transparency of the glass article compared to the transparency of the zinc acetylacetonate treated glass articles.

In the present invention, the solvents for the organic zinc compound are alcohols containing from 1 to 4 carbon atoms. Of the suitable alcohols, normal propyl alcohol is preferred. The solvent, however, may be any aliphatic or aromatic compound which is capable of dissolving the organic zinc material selected and which is sufficiently volatile to evaporate fairly rapidly at the temperature applied. Among the other suitable solvents are various hydrocarbons and halogenated hydrocarbon derivatives. Some of the aromatic non-polar solvents which may be used are benzene, toluene, xylene or various mixtures thereof.

In the present invention, zinc is bridge bonded to the glass surface being treated. The concentration of zinc bonded to the treated glass surface depends upon the temperature at which the organic zinc solution is applied and the concentration of the organic zinc compound in the solvent. For purposes of the present invention, suitable resistance to iridescence, scumming and staining of the glass sheet is obtained when the bridge bonded zinc concentration is between about 0.000025 and 0.000045 milligram per square inch of glass surface. This range of zinc concentrations can be obtained by contacting the glass sheet between 100° F. and 800° F. Temperatures much above 800° F. tend to promote the formation of zinc oxide films on the glass surface rather than zinc bridge bonding. At temperatures below about 100° F., inadequate concentrations of zinc are bridge bonded to the glass surface. The preferred temperature of application is between about 400° F. and 450° F.

The concentration of organic zinc compound or compounds in the treating solution of the present invention is preferably about 2.0 percent by volume. Suitable treating solutions, however, vary from about 0.5 to 2.5 percent by volume. Concentrations higher than about 2.5 percent by volume are not normally attainable due to the relatively low solubility of the organic zinc compounds in the solvents preferred.

The present invention will protect most ordinary alkali-containing glass compositions that are subject to weathering surface deterioration. The invention particularly applies, however, to glass compositions defined by the following ranges of the oxide components indicated below:

| Oxide: | Percent |
| --- | --- |
| $SiO_2$ | 50–75 |
| $Na_2O$ | 5–17 |
| $K_2O$ | 0–10 |
| $Na_2O+K_2O$ | 10–18 |
| CaO | 1–15 |
| MgO | 0–7 |
| CaO+MgO | 0–16 |
| $Al_2O_3$ | 0–2 |

These oxide ranges encompass the ordinary commercial window, sheet and plate glass compositions.

The present invention will be further understood by making reference to the following examples:

Example I is the preferred embodiment of the present invention and constitutes the best mode contemplated by the inventors for carrying out the practice of the invention.

EXAMPLE I

Seventy-two (72) grams of zinc acetylacetonate are mixed in 3600 milliliters of normal propyl alcohol. This solution contains about 2.0 percent by volume zinc acetylacetonate.

Glass sheets 12 inches by 12 inches by ⅛ of an inch thick are fabricated using conventional melting and forming techniques from the following calculated base glass composition:

Composition "A"

| Component: | Percent by weight |
| --- | --- |
| $SiO_2$ | 71.6 |
| $Na_2O$ | 13.1 |
| CaO | 11.7 |
| MgO | 2.5 |
| $Al_2O_3$ | 0.3 |
| $Na_2SO_4$ | 0.7 |
| NaCl | 0.1 |
| $Fe_2O_3$ | 0.1 |

The glass sheets are heated to 800° F. for 10 minutes in a muffle furnace. The glass sheets are then transferred to another furnace heated to 450° F. After the glass sheets have reached a temperature of approximately 450° F. (10 minutes), they are sprayed at 450° F. with the previously prepared 2.0 percent by volume zinc acetylacetonate normal propyl alcohol solution. The solution is applied about 1/16 ounce per square foot of glass surface. The glass sheets are then allowed to cool to room temperature. After cooling, no change in the appearance of the glass sheets is evident.

The glass sheets are then placed in a cyclic humidity testing cabinet for accelerated weathering to determine their resistance to iridescence, scumming and staining. No iridescence, scumming or staining of the glass surfaces is evident after 8 days exposure in the testing apparatus.

The sheets contain about 0.000035 milligram of zinc per square inch of glass surface before and after testing.

EXAMPLE II

Thirty-six (36) grams of zinc acetylacetonate are mixed in 3600 milliliters of solution consisting of 1800 milliliters normal propyl alcohol and 1800 milliliters toluene. This solution contains about 1.0 percent by volume zinc acetylacetonate.

Glass sheets 12 inches by 12 inches by ⅛ of an inch thick are fabricated using conventional melting and forming techniques from the following calculated base glass composition:

Composition "B"

| Component: | Percent by weight |
| --- | --- |
| $SiO_2$ | 73.0 |
| $Na_2O$ | 13.2 |
| CaO | 8.5 |
| MgO | 3.5 |
| $Al_2O_3$ | 1.2 |
| $Na_2SO_4$ | 0.4 |
| NaCl | 0.1 |
| $Fe_2O_3$ | 0.1 |

The glass sheets are heated to 800° F. for 10 minutes in a muffle furnace. The glass sheets are then transferred to another furnace heated to 450° F. After the glass sheets have reached a temperature of approximately 450° F. (10 minutes), they are sprayed with the previously prepared 1.0 percent by volume zinc acetylacetonate N-propyl-alcohol-toluene solution over both major surfaces. The solution is applied about 1/16 ounce per square foot of glass surface. The glass sheets are then allowed to cool to room temperature. After cooling, no change in the appearance of the glass sheets is evident. The glass sheets are then placed in a cyclic humidity testing cabinet for accelerated weathering to determine their resistance to iridescence, scumming and staining.

No iridescence, scumming or staining is evident on the glass sheets after seven days of testing in the cyclic humidity testing apparatus.

The zinc concentration on these glass sheets is about 0.000031 milligram per square inch of glass surfaces before and after testing.

EXAMPLE III

Fifty-four (54) grams of zinc acetylacetonate are mixed in 3600 milliliters of solution consisting of 1800 milliliters methyl alcohol ($CH_3OH$) and 1800 milliliters benzene. This solution contains about 1.5 percent by volume zinc acetylacetonate.

Glass sheets 12 inches by 12 inches by ⅛ of an inch thick are fabricated using conventional melting and forming techniques from the following calculated base glass composition:

Composition "C"

| Component: | Percent by weight |
| --- | --- |
| $SiO_2$ | 71.25 |
| $Na_2O$, $K_2O$ | 13.37 |
| CaO | 11.71 |
| MgO | 2.41 |
| $Al_2O_3$ | 0.15 |
| $Na_2SO_4$ | 0.6 |
| $Fe_2O_3$ | 0.51 |

The glass sheets are heated to 800° F. for 10 minutes in a muffle furnace. The glass sheets are then transferred to another furnace heated to 450° F. After the glass sheets have reached a temperature of approximately 450° F. (10 minutes), they are sprayed with the previously prepared 1.5 percent by volume zinc acetylacetonate methyl alcohol-benzene solution over both major surfaces. The solution is applied about ⅟₁₆ ounce per square foot of glass surface. The glass sheets are then allowed to cool to room temperature. After cooling, no change in the appearance of the glass sheets is evident. The glass sheets are then placed in a cyclic humidity testing cabinet for accelerated weathering to determine their resistance to iridescence, scumming and staining.

No iridescence, scumming or staining is evident on the glass sheets after seven days of testing in the cyclic humidity testing apparatus.

The zinc concentration on these glass sheets is about 0.000035 milligram per square inch of glass surface before and after testing.

EXAMPLE IV

In the Pennvernon process of manufacturing sheet glass, a continuous glass sheet is vertically drawn upward from the surface of a pool of molten glass and passed through a drawing machine. Freshly drawn glass sheets in this process are found to exhibit high surface chemical activity. This high surface chemical activity decreases with the passage of time. It is theorized that the high surface chemical activity of freshly drawn sheet glass is due to the presence of a large number of unsatisfied surface chemical bonds on the new glass surfaces. The decrease in the surface chemical activity with time is believed due to the satisfaction of these unsatisfied chemical bonds. The satisfaction of the surface bonds is accomplished by the surface absorbing moisture and dust, or by reacting with various gases in the atmosphere.

To neutralize the high surface chemical activity of freshly drawn sheet glass, $SO_2$ gas has been employed in the drawing machine atmosphere. The use of $SO_2$ in the drawing machine of a sheet glass manufacturing operation is disclosed in U.S. Patent 1,782,169.

The present invention can be practiced in conjunction with the $SO_2$ treatment. A treating solution is prepared according to the present invention by dissolving 360 grams of zinc acetylacetonate in a solution of 20 milliliters concentrated hydrochloric acid and 18 liters of normal propanol. This solution is sprayed on the glass sheet as it is drawn through the drawing machine after a previous treatment with $SO_2$ gas in the lehr. The preferred temperature of the glass sheet at the time of spraying is approximately 520° F. The temperature of the glass sheet, however, can be between about 500° F. and 600° F. The amount of treating solution used is approximately ⅟₁₆ ounce per square foot of glass surface.

Glass sheets treated with zinc acetylacetonate at 520° F. after the $SO_2$ gas treatment are transparent, easy to clean and are suitable for producing mirrors. Samples of sheet glass treated by this technique are found to resist noticeable iridescence, scumming and staining in the cyclic humidity testing apparatus for a period of between four and five days.

The amount of $SO_2$ gas introduced into the lehr of the drawing machine when used in combination with the present invention is between one to three ounces per hour. The $SO_2$ gas is introduced with an equal amount of air on a weight basis.

The cyclic humidity testing apparatus consists of a glass aquarium-like tank positioned within an insulated air incubation oven provided with an electrical resistance heating coil. The cyclic humidity test consists of subjecting the glass samples to a continuous series of alternate heating and cooling cycles. The heating and cooling cycles are each 90 minutes long. During the 90-minute heating cycle, the temperature of the oven is raised to between about 140° F. and 150° F. During each cooling cycle, the temperature is reduced to about 120° F. and maintained at that temperature for the remainder of the 90-minute cooling period.

The glass samples are positioned on stainless steel racks and set in the two foot by one and one-half foot aquarium tank in the oven. About one inch of water is then placed in the bottom of the tank.

The stainless steel racks support the glass samples about two inches above the bottom of the tank and about one inch above the water level. During the 90-minute heating period, the water placed in the bottom of the tank evaporates to establish an atmosphere in the apparatus of nearly 100 percent relative humidity. During the 90-minute cooling period, moisture vapor condenses on the glass sample to promote the weathering attack. The heating and cooling cycles are continued 24 hours a day during evaluation of the glass samples.

The degree of resistance to iridescence, scumming and staining is determined by visually inspecting the samples at daily intervals. The samples are inspected by holding them at an angle between about 30° and 45° in front of any convenient source of light. A single day's exposure (24 hours) in the test apparatus corresponds roughly to about six to eight months exposure in an unheated warehouse under conditions of high relative humidity.

The present invention is particularly suited for incorporation in the Pennvernon continuous method of manufacturing sheet glass. The heat contained in the glass sheet as it is drawn in the kiln volatilizes the organic component of the zinc compound and the solvent leaving the transparent protecting zinc coating on the glass surface. The treatment is compatible with the $SO_2$ atmosphere presently used in the lehr of the Pennvernon drawing machine. The protecting coating being transparent permits inspection of the treated sheet glass for defects. There is no need, therefore, to first cool the glass for inspection and then reheat the glass found free from defects to adhere the protective zinc. The protecting zinc coating also does not in any way adversely affect the glass surface upon which other metallic coatings are to be applied, such as in the production of mirrors.

We claim:
1. A process for treating transparent soda-lime-silica glass which comprises contacting a glass surface at a temperature between 100° F. and 800° F. with a dilute organic solution of zinc acetylacetonate for a period sufficient to render the glass surface resistant to iridescence, scumming, and staining after said glass has been cooled to room temperature.

2. A process according to claim 1 in which the concentration of $Zn(C_5H_7O_2)_2$ in the treating solution is between 0.05 and 2.5 percent by volume.

3. A process according to claim 1 in which the solvent of the $Zn(C_5H_7O_2)_2$ solution is normal propyl alcohol.

4. A process according to claim 1 in which the soda-lime-silica glass article consists essentially of the following ingredients, in percent by weight: 50 to 75 percent $SiO_2$, 5 to 17 percent $Na_2O$, 0 to 10 percent $K_2O$, 10 to 18 percent $Na_2O+K_2O$, 1 to 15 percent $CaO$, 0 to 7 percent $MgO$, 1 to 16 percent $CaO+MgO$ and 0 to 2 percent $Al_2O_3$.

5. A process according to claim 1 in which the soda-lime-silica glass is contacted with the solution of zinc acetylacetonate after a previous treatment with $SO_2$ gas.

6. A process according to claim 5 in which the temperature of the soda-lime-silica glass is between 500° F. and 600° F.

References Cited

UNITED STATES PATENTS 3,202,054   8/1965   Mochel _____ 117—33.3 X

ALFRED L. LEAVITT, *Primary Examiner.*

H. COHEN, *Assistant Examiner.*

U.S. Cl. X.R.

65—30